W. COOLEY.
OBTAINING CREAM FROM MILK.
No. 187,516.   Patented Feb. 20, 1877.
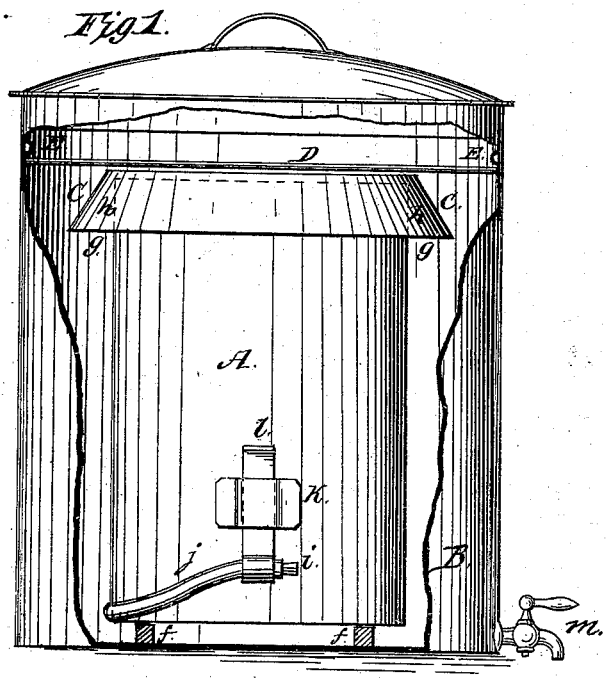
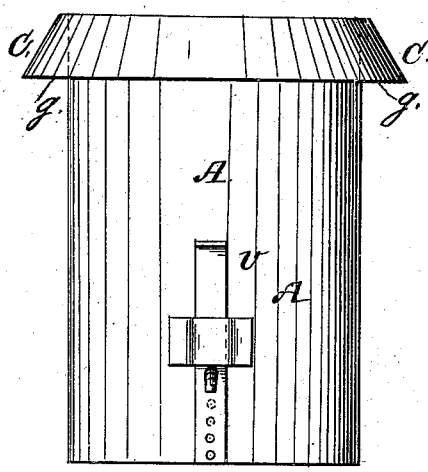
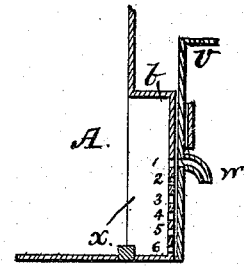
Witnesses:
Geo. W. Kennedy
Lewis Wells
Inventor,
Wm. Cooley

UNITED STATES PATENT OFFICE.

WILLIAM COOLEY, OF WATERBURY, VERMONT.

IMPROVEMENT IN OBTAINING CREAM FROM MILK.

Specification forming part of Letters Patent No. 187,516, dated February 20, 1877; application filed October 27, 1876.

*To all whom it may concern:*

Be it known that I, WILLIAM COOLEY, of Waterbury, in the county of Washington and State of Vermont, have invented a new and useful Improvement in Milk-Pans, of which the following is a specification:

My invention relates to a new process of raising cream from milk; and it consists mainly in water-sealing the milk within the vessel containing it; and, also, in submerging such vessel in water, and in apparatus hereinafter described.

The ordinary mode of raising cream is with open pans, either shallow or deep, and then by hand-labor skimming the cream from the surface after the milk has stood, say, from thirty-six to forty-eight hours. This mode is open to several serious objections, among which may be named the exposure of the milk to the atmosphere, from which it attracts insects and absorbs gases and odors often very deleterious, and from which it collects and retains dust and dirt floating in the air, the agitation of its surface from winds and other causes, the great length of time required to raise the cream, the unavoidable lack of uniformity in the quality of the cream, and, consequently, in the butter made from it, because of the various subtle and invisible atmospheric causes which tend to taint, acidify, or otherwise vitiate it, the positive and direct exposure to all the sudden changes—electrical, thermal, and otherwise—of the atmosphere, and the necessity of having pans enough to hold the milk of two or more days' milking.

When milk is set in open vessels which are cooled by water underneath them, it being at a lower temperature than the surrounding atmosphere, and being, as is well known, a ready absorbent of odors and taints, it will absorb from the air by condensation the moisture contained in it together with its impurities.

Another method is to place the milk in a closed pan or vessel, and then place this in a tub or box containing more or less water, as shown in my Patent No. 184,062; but in this method the contents of the pan are not uniformly cooled throughout the whole mass, inasmuch as the pan is not submerged, a portion only taking the temperature of the water, and the upper portion being exposed to another temperature—namely, that of the surrounding atmosphere; hence, there is a corresponding inequality in the temperature of different portions of the milk and consequential bad results in the quality of the cream produced and of the butter made from it; nor by this method is the pan or vessel water-sealed.

By my present invention I water-seal the can, or other vessel containing the milk to be treated, whereby all possibility of the entrance into it of foreign matter, gases, or odors is prevented, and when I wish to bring the whole to a uniform temperature, to any degree desired, I then submerge this vessel entirely in water of the required low degree.

The effect of these two steps of the operation is the production of a better quality and of an increased quantity of cream, and in a far less period of time than usual; the securing of a uniformity of quality all the year round; great economy in time, apparatus, and expense; a superiority in the skimmed milk; the production from the cream thus raised of a butter having not only a better quality, but also a better keeping property, and the capacity in the remaining milk, technically called "skimmed milk," of producing a better character of cheese.

My invention can be very simply and cheaply practiced, and by very simple means—such, for instance, as a tank or vessel, B, for holding water, a pan or can (or cans), A, preferably cylindrical, for holding the milk, provided with a removable cover, C, shaped similarly to an ordinary tin pan, and placed upside down on top of the pan A, and held down by any appropriate weight or fastening, the overlapping or flaring sides of the cover leaving an annular space between such sides and the vessel A.

No packing is required to make this cover water-tight when the water is high enough in the tank B to reach up to or a little above the lower edge of the cover, because the air in this annular space is then unable to rise and escape, and remains there, thus making a perfect air-packing, and the whole can is thus simply but completely water-sealed.

This water-sealing is a distinct thing from submerging, and if the water be no higher than is sufficient thus to seal the cover, all the advantages due to the exclusion of the outer atmosphere and atmospheric effects are completely attained, and a nearer approximation is also made to an equalization of the temperature of the contents of the can than by any other method known to me; but by submerging or covering the vessel and its cover completely with water still better effects are attainable, as there is thereby insured an equality of temperature for the entire vessel and its contents, and no part of the milk can in such case be subjected to one degree of temperature from the water while another part is subjected to a different degree from the outer air.

The degree of temperature of the water, for the best effects, may vary with circumstances—say from 40° to 50° Fahrenheit; but I find most satisfactory results at about 45°, this cool condition of the watery part of the milk seeming to make it more dense, and thus to drive upward the oily portions or butter globules, which are not so readily affected or condensed at the same degree.

By my improved method the same uniform results are obtainable in all climates and at all seasons of the year, and the milk may be taken warm from the cow, thus retaining its natural flavor, adding greatly to the market value of the butter made from it. The cream thus raised also is more liquid than ordinary cream, and in the most favorable form to separate or "gather" the butter globules in churning.

Milk set in the early part of the day will, by my process, yield its cream before the vessels will be needed for the milk drawn at evening, thus dispensing with about three-fourths of the pans or cans required by any other process.

The usual method of skimming or dipping the cream from the surface of the milk is laborious, requires skill, and is attended by a loss of cream, because of its becoming mixed with the milk during the operation. I dispense with all dipping or skimming, and, instead, I gradually and gently permit the milk to be discharged from the can without disturbing the cream, which is all left alone in the can, and can then be poured out all together, no special skill being required. As a means for accomplishing this, I attach to an outlet at the bottom of the can a flexible tube, $j$, whose other and discharging end is connected with a slide, $l$, arranged to be adjustable at will upon the side of the can, not far from its bottom.

When the cream is set and is to be taken from the can, any appropriate stop-cock, plug, or valve, $i$, connected with this tube is turned or removed to permit the flow, the slide $l$ having been previously adjustable for a height from the bottom of the can about equal to the depth of cream in the can.

The pressure of the liquid contents of the can steadily forces a stream of the milk up through the tube, and this continues until all the milk has been discharged, leaving only the cream, which does not pass up and through the tube, as its top line or level is no longer above the discharging-mouth of the tube, and the pressure has ceased. This easy descent of the cream, resting all the time on the surface of the milk as on a solid bed, prevents any agitation or disturbance of it or its globules, and any commingling of it with the milk from which it has been separated.

Fig. 3 is a modification of devices for withdrawing the milk and leaving the cream in the can. In this case the can has a side projection or chamber, $b$, connecting with the chamber of the can by an opening, $x$, and this chamber $b$ has a series of holes, 1, 2, 3, 4, 5, 6, &c., to permit the discharge of the milk at such point as shall be determined by the adjusted position of the slide-valve $v$, which covers all the openings when desired, or all but the one from which the discharge is to take place, which occurs when the spout $w$ of the slide is adjusted to coincide with such opening and permit the flow.

I claim—

1. The process of treating milk for raising cream by sealing with water and air the cover applied directly to the vessel containing the milk, substantially as set forth.

2. The described process of treating milk for the raising of cream by totally submerging in water the closed vessel containing it.

3. The described process of separating the cream, after it has been raised from the milk from which it was raised, by gradually and automatically withdrawing such milk from the bottom of the vessel, leaving the body of cream therein.

4. The combination, in an apparatus for setting milk for cream, of a vessel for holding the milk, a cover adapted for water-sealing the same, and a fastening device serving to hold the cover to the vessel, substantially as shown and described.

5. In combination with the vessel for milk, and with the water-sealing cover and fastening device, a water-vessel adapted to contain the milk-vessel and to permit it to be water-sealed or submerged therein, substantially as shown and described.

6. In combination with a can or vessel for raising cream, a flexible tube, $j$, applied at the bottom of the can, and adjustable at its exit end to the desired height, and adapted for discharging the milk from the vessel, leaving the cream remaining therein, substantially as shown and described.

WM. COOLEY.

Witnesses:
JAMES W. MERRILL,
GEO. W. KENNEDY.